Patented July 2, 1946

2,403,004

UNITED STATES PATENT OFFICE 2,403,004

DEESTERIFICATION OF COPOLYMERS OF ACRYLIC ESTERS AND VINYL ESTERS

William O. Kenyon, Thomas F. Murray, Jr., and Louis M. Minsk, Rochester, N. Y., assignors to Eastman Kodak Company, Rochester, N. Y., a corporation of New Jersey No Drawing. Application July 10, 1942,
Serial No. 450,404

4 Claims. (Cl. 260—84)

This invention relates to synthetic resins and to a process for the preparation thereof.

It is known that copolymers of vinyl carboxylic esters and acrylic esters can be saponified to give saponification products free from ester (carbalkoxyl) groups, and that such saponification products can be lactonized to give products which are insoluble not only in water, but in most organic solvents as well.

We have now found that certain copolymers of vinyl carboxylic esters and acrylic esters, viz. those obtained by polymerizing about one molecular proportion of a vinyl carboxylic ester with from about two to about three molecular proportions of an acrylic ester (an ester of an acrylic acid) can be deesterified under certain conditions to give resins possessing good solubility in many organic solvents. Contrasted with the aforesaid known lactonized products, our new products contain carbalkoxyl groups. With copolymers, such as are obtained by copolymerizing vinyl carboxylic esters and acrylic esters in equimolecular proportions, products having desirable solubility in organic solvents cannot be obtained, even under the conditions of our new process.

Film especially suited as a support for light-sensitive photographic silver halide coatings, can be made from some of our new resins, we have found. Such film is characterized by high flexibility, being superior to cellulose acetate film in this respect, although possessing a lower tensile strength than cellulose acetate film.

It is, accordingly, an object of our invention to provide new resins and a process for preparing the same. A further object is to provide films of such resins and a process for the preparation thereof. Other objects will become apparent hereinafter.

In accordance with our invention, we deesterify a copolymer obtained by copolymerizing about one part by weight of one or more vinyl carboxylic esters with from two to three parts of one or more esters of acrylic acid, with an alcohol, in the presence of an acid deesterification catalyst. As vinyl carboxylic esters, vinyl acetate, vinyl propionate and vinyl benzoate are exemplary. We have found that vinyl acetate is advantageously employed. As acrylic esters, methyl, ethyl, isobutyl and benzyl acrylate are exemplary. We have found that methyl acrylate is advantageously employed. The copolymers can be prepared by mixing one molecular proportion of the vinyl carboxylic ester and from about two to about three molecular proportions of the acrylic ester and subjecting the mixture to polymerization. The known polymerization catalysts can be used, preferably organic peroxides, such as benzoyl peroxide.

Resins prepared according to our new process from copolymers of acrylic esters of methyl alcohol are especially suitable for the manufacture of photographic film support. As the molecular weight of the alcohol radical of the acrylic ester is increased the resulting resins become softer and more rubbery. Such resins while useful for many purposes, such as the lamination of glass, are not well suited for the manufacture of photographic film support of the cinematographic type.

As alcohols to effect the deesterification, the monohydric, particularly the monohydric primary alcohols which are liquid at 20° C., are most efficacious. Primary alcohols of the formula $C_nH_{2n+1}OH$ wherein $n$ represents a positive integer of from one to four are advantageously employed. The amount of alcohol employed is advantageously sufficient to form a solution of the copolymer at the reaction temperature. It may be necessary to employ water along with the alcohol in order to form a solution of the copolymer. As the deesterification of the copolymer proceeds, the deesterified copolymer precipitates out from solution when methyl alcohol is employed.

As acid deesterification catalysts, any of the known acid catalyst can be employed. Strong acids, such as hydrochloric acid, sulfuric acid, benzenesulfonic acid or toluenesulfonic acid, are advantageously employed. Strong mineral acids are especially suitable.

The following examples will serve to illustrate our new resins and the manner of obtaining the same.

Example 1

A. 75 g. of vinyl acetate and 225 g. of methyl acrylate were mixed in 1500 cc. of benzene containing 0.3 g. of benzoyl peroxide. The resulting mixture was heated, under reflux, on a steam bath for about 96 hours. The resulting reaction mixture was poured into hot distilled water. The copolymer which precipitated was steamed to remove benzene and unreacted monomers. The soft plastic polymer was then dried at 60° C. in a vacuum of about 25 mm. of Hg for from 6 to 10 days. This copolymer had an acetyl group content of 5.84 percent by weight (equivalent to 11.68 percent of vinyl acetate), methoxyl group content of 29.4 percent by weight (equivalent to 81.3 percent of methyl acrylate), no free acidity and a saponification value of 11.71 cc. of N sodium hydroxide per gram of resin. The copolymer was cast from acetone solution onto a film-forming surface and the film cured at 65° C. The film (0.005 inch thick) had a breaking load of 1.0 kg. and an elongation of 250 percent. It was so stretchy that Schopper folds had no significance. When extra cured at 100° C., the film melted.

B. 25 g. of the above copolymer were dissolved with heat and agitation in a mixture of 180 cc. of methyl alcohol and 20 cc. of distilled water. To this solution was added a mixture of 51 cc. of hydrochloric acid (sp. g. 1.18) in 50 cc. of methyl alcohol. This addition caused the copolymer to precipitate. The mixture was refluxed for 48 hours. The supernatant liquid was then poured off. The remaining resinous precipitate was dissolved in acetone and the resin precipitated by pouring into water. The precipitated resin was thus dissolved and precipitated three additional times. The resin was then dried at atmospheric pressure in a current of air and subsequently dried at 60° C. under reduced pressure. The resin contained an acetyl group content of 0.02 percent by weight and a methoxyl group content of 25.1 percent (equivalent to 47.8 percent by weight of carbmethoxyl). 1 g. of the resin neutralized 1.00 cc. of N sodium hydroxide (equivalent to 7.2 percent by weight of combined acrylic acid). The resin had a saponification value of 11.59 cc. of N sodium hydroxide per gram of resin. A film of this resin 0.005 inches thick was cast from acetone solution. After curing for 24 hours at 65° C., the film had a breaking load of 10.5 kg., an elongation of 4 percent and gave 50 sharp folds before breaking.

*Example 2*

25 g. of the copolymer described in Example 1, under A, were dissolved with heat and agitation in a mixture of 180 cc. of methyl alcohol and 20 cc. of distilled water. To this solution was added a mixture of 15 cc. of concentrated sulfuric acid in 50 cc. of methyl alcohol. The resulting mixture was refluxed for about 24 hours. The supernatant liquid was then poured off. The remaining resinous precipitate was twice washed with distilled water. The washed precipitate was dissolved in acetone and reprecipitated in water. This reprecipitation was repeated several times, until the water in which the resin was precipitated gave no test for acid. The resin was then dried at atmospheric pressure and subsequently at 60° C. under reduced pressure for 12 days. The resin contained 0.11 percent by weight of acetyl and 26.1 percent of methoxyl (equivalent to 49.6 percent by weight of carbmethoxyl). The resin had a saponification value of 11.64 cc. of N sodium hydroxide per gram of resin. A film of this resin 0.005 inch thick was cast from a solution in 94 percent aqueous acetone. After curing at 65° C. for 24 hours, the film showed a breaking load of 8 kg., an elongation of 10 percent and 50 sharp folds before breaking.

*Example 3*

A copolymer was prepared as described in Example 1, under A, except that the ratio of vinyl acetate to methyl acrylate was 1:2.5. This copolymer contained 6.8 percent by weight of acetyl (equivalent to 13.6 percent of vinyl acetate) and 29.4 percent by weight of methoxyl (equivalent to 81.4 percent by weight of methyl acrylate).

50 g. of this copolymer was dissolved in a mixture of 360 cc. of methyl alcohol and enough water (15 to 55 cc.) to form a clear solution. To this solution was added a mixture of 100 cc. of concentrated hydrochloric acid and 100 cc. of methyl alcohol, slowly while stirring and warming the solution. Resin precipitated after only a small portion of the acid mixture had been added. The resulting mixture was heated on a steam bath for about 24 hours. The supernatant liquid was poured off. The remaining resinous precipitate was dissolved in 90 percent aqueous acetone, and the acetone solution poured into distilled water to precipitate the resin. This reprecipitation was repeated several times until the water was free from acid. The resin was then dried at 50° to 60° C. The resin contained 0.27 percent by weight of acetyl and 31.0 percent by weight of methoxyl (equivalent to 59 percent carbmethoxyl). Free carboxyl was equivalent to 4.67 percent of combined acrylic acid. The resin had a saponification value of 13.08 cc. of N sodium hydroxide per gram of resin. A film of this resin 0.005 inch thick was cast from acetone solution. After curing for 24 hours at 65° C. and extra curing at 100° C. for 24 hours, the film showed a breaking load of 5.0 kg., an elongation of 60 percent and gave 50 to 100 sharp folds before breaking.

*Example 4*

50 g. of the copolymer described in Example 1, under A, were placed in 360 cc. of a mixture of 9 volumes of methyl alcohol and 1 volume of n-primary butyl alcohol. To the mixture were added 40 cc. of distilled water. The whole was heated at 50° C., under reflux, until the copolymer dissolved. There was then slowly added to the solution, 110 cc. of a solution prepared by mixing 30 cc. of concentrated hydrochloric acid and 130 cc. of the above mixture of alcohols. Slight precipitation occurred. The mixture was heated on the steam bath for about 100 hours. The mixture was then poured into 3 liters of distilled water to precipitate the resin. The resin was dissolved in acetone and the solution again poured into distilled water to precipitate the resin. The resin was finally dried at 60° C. under reduced pressure. A film of this resin was cast from acetone solution. After curing for 48 hours at 100° C. the film had a thickness of 0.005 inch. It showed a breaking load of 3 kg., an elongation of 80 percent and gave 120 sharp folds before breaking.

*Example 5*

50 g. of the copolymer described in Example 1, under A, were placed in 360 cc. of a mixture of 350 cc. of methyl alcohol and 150 cc. of n-primary butyl alcohol. 40 cc. of water were added to the mixture. The whole was heated at 50° C., under reflux, until the copolymer dissolved. The solution was heated on a steam bath and to it was added a solution of 30 cc. of hydrochloric acid (sp. g. 1.18) in 130 cc. of the above alcohol mixture. No precipitation of resin occurred. Heating on the steam bath was continued for about 80 hours. The reaction mixture was then poured into distilled water to precipitate the resin. The precipitated resin was soaked in fresh distilled water to remove butyl alcohol. The resin was dissolved in acetone and the acetone solution poured into water to precipitate the resin. The precipitated resin was dried at 60° C. under reduced pressure. A film of this resin was cast from acetone solution. After curing for 48 hours at 100° C., the film had a thickness of 0.005 inch, a breaking load of 4 kg., an elongation of 300 percent and gave 200 sharp folds before breaking. The instant resin and that of Example 4 appeared to contain butoxyl groups, arising from an ester interchange between the carbmethoxyl groups of the methyl acrylate units of the copolymer and the butyl alcohol. It appears that the higher the concentration of butyl alcohol employed, the greater the number of butoxyl groups introduced. Thus the resin of the instant example contains a larger number of butoxyl groups than the resin of Example 4, as manifested by the increased flexibility and stretchiness of the instant resin.

Our new resins can also be prepared by esterifying the known products obtained by completely saponifying a copolymer obtained by polymerizing a mixture of one part by weight of a vinyl carboxylic ester and from two to three parts by weight of an acrylic ester, and lactonizing the completely saponified product. The alcohol employed to effect the esterification can be any alcohol, preferably a primary alcohol. Methyl alcohol gives resins especially useful in the manufacture of photographic film support. The esterification is advantageously carried out in the presence of an acid esterification catalyst. The following examples will serve to illustrate this method for obtaining our resins.

Example 6

A. 100 g. of the copolymer of vinyl acetate and methyl acrylate obtained according to Example 1, under A, were dissolved in one liter of pyridine, with agitation. To this solution was added, with stirring, a cool solution of 154 g. of potassium hydroxide in 900 cc. of methyl alcohol. 500 cc. of pyridine were added to the resulting mixture, and stirring was continued. The solution became cloudy and thick, and a precipitate began to separate. The mixture was maintained at 50° to 60° C. for about 48 hours. The pyridine solution was poured off the precipitate (completely saponified product) and the residue dissolved in 3 liters of distilled water. The resulting solution was divided into two equal parts.

B. To one of the above parts of solution, were added concentrated hydrochloric acid (sp. g. 1.18) until the solution was acid to litmus, but not to Congo red. The lactonized form of the completely saponified product precipitated. The precipitate was washed by decantation with water until nearly free from acid. The moist residue was dissolved in 500 cc. of methyl alcohol and 100 cc. of distilled water, and then diluted with aqueous methyl alcohol of the same concentration, to 1000 cc. To 750 cc. of this solution were added 90.5 cc. of concentrated hydrochloric acid (sp. g. 1.18). The resulting mixture was heated on the steam bath, under reflux, for 56 hours. A soft precipitate formed. The supernatant liquid was poured off. The precipitate was dissolved in acetone and the resin reprecipitated by pouring the acetone solution into water. The precipitated resin was washed with water until the wash water was neutral to litmus. The resin was dried in vacuo at 60° C. The resin contained no acetyl. Its methoxyl group content was 24.1 percent and the carboxyl group content 8.95 percent. A film of this resin was cast from acetone solution. After curing at 100° C., the film had a breaking load of 6.6 kg., an elongation of 30 percent and gave 80 to 120 sharp folds.

C. To the other of the above parts of solution of the completely saponified product, were added a mixture of 10 volumes of sulfuric acid (sp. g. 1.84) and 9 volumes of water, until the solution was acid to litmus but not to Congo red. The lactonized form of the completely saponified product precipitated. The precipitate was washed practically free from acid and then dissolved in a mixture of 500 cc. of methyl alcohol and 230 cc. of water and the solution was made up to 1 liter with a mixture of methyl alcohol and water of the same concentration. To 750 cc. of this solution was added a mixture of 30 cc. of sulfuric acid and 60 cc. of water. The mixture was placed on a steam bath under reflux. After about 56 hours, the supernatant liquid was poured off and the residual resin was dissolved in acetone. The acetone solution was poured into water to reprecipitate the resin. The precipitated resin was washed free from water and dried at 60° C. in vacuo. The resin contained no acetyl groups and contained a methoxyl group content between 20.3 and 22.3 percent by weight. The resin became gelatinous in acetone solution.

Film or sheet can be prepared from our new resins by dissolving the resins in a suitable solvent and casting the solution on a film-forming surface, such as a metal or glass plate or a revolving drum, to desired thickness and drying the resulting film or sheet. Drying may be facilitated by blowing warm air over the drying film or sheet. When sufficiently dry, the film or sheet is stripped from the film-forming surface and "cured" by treating with warm air. The "curing" removes the residual solvent. Suitable solvents are: acetone, 1,4-dioxane, ethyl acetate, the monomethyl ether of ethylene glycol (and the warm monoethyl ether of ethylene glycol), a mixture of 90 volumes of acetone and 10 volumes of methyl alcohol, a mixture of 90 volumes of ethylene chloride and 10 volumes of acetone or a mixture of 80 volumes of methylene chloride and 20 volumes of ethyl alcohol. Ordinarily from 2 to 3 volumes of solvent to 1 weight of resin gives a suitable solution for casting.

Film or sheet made from our new resins obtained by deesterifying with methyl alcohol a copolymer of vinyl acetate and methyl acrylate is especially useful as a support for photographic silver halide emulsions such as silver halide emulsions in which gelatin, polyvinyl alcohol or hydrolyzed cellulose esters are employed as the carrier. The film or sheet can be coated directly with the emulsion or can be coated with resinous or other known "subbing" materials before the photographic emulsions are applied.

Our new resins are compatible with a number of compounds which serve to plasticize the resins. Typical of such plasticizers are the following:

Benzyl phthalate
Benzyl succinate
Butoxyethyl tetrahydrofuroate
Cyclohexyl acetate
Diethylene glycol monobutyl ether
Diethylene glycol dibutyrate
Ethoxy ethyl adipate
Ethoxyethyl sebacate
Ethylene glycol monobenzyl ether
Methoxyethyl phthalate
Tetrahydrofurfuryl adipate
Triacetin
Tripropionin
Triamyl phosphate
Tributyl phosphate
Triethylene glycol diacetate
Triphenyl phosphate
Camphor
Tribromo phenol When suitably plasticized, our new resins can be molded by injection or compression processes, or can be extruded into sheeting of various thicknesses by the ordinary extrusion processes. Threads of our new resins can be formed by extruding solutions of the resins through fine orifices into a warm chamber, or into a liquid precipitating medium.

What we claim as our invention and desire to be secured by Letters Patent of the United States is:

1. A process for preparing a resin comprising preparing a deesterification mixture by deesterifying a copolymer obtained by polymerizing one molecular proportion of a mono vinyl ester of a monocarboxylic acid containing no aliphatic unsaturation and from two to three molecular proportions of an ester of acrylic acid and a monohydric alcohol containing no aliphatic unsaturation, with a monohydric primary alcohol liquid at 20° C., in the presence of only an acid deesterification catalyst and water, and separating the resin from the acid deesterification mixture, whereby a resin which is soluble in acetone, in methyl acetate and in 1,4-dioxane is obtained.

2. A process for preparing a resin comprising preparing a deesterification mixture by deesterifying a copolymer obtained by polymerizing one molecular proportion of vinyl acetate and from two to three molecular proportions of methyl acrylate, with a monohydric primary alcohol which is liquid at 20° C., in the presence of only an acid deesterification catalyst and water, and separating the resin from the acid deesterification mixture, whereby a resin which is soluble in acetone, in methyl acetate and in 1,4-dioxane is obtained.

3. A process for preparing a resin comprising preparing a deesterification mixture by deesterifying a copolymer obtained by polymerizing one molecular proportion of vinyl acetate and from two to three molecular proportions of methyl acrylate, with a monohydric primary alcohol of the formula $C_nH_{2n+1}OH$ wherein $n$ represents a positive integer of from 1 to 4, in the presence of only an acid deesterification catalyst and water, and separating the resin from the acid deesterification mixture, whereby a resin which is soluble in acetone, in methyl acetate and in 1,4-dioxane is obtained.

4. A process for preparing a resin comprising preparing a deesterification mixture by deesterifying a copolymer obtained by polymerizing one molecular proportion of vinyl acetate and from two to three molecular proportions of methyl acrylate, with a monohydric primary alcohol of the formula $C_nH_{2n+1}OH$ wherein $n$ represents a positive integer of from 1 to 4, in the presence of only hydrochloric acid and water, and separating the resin from the acid deesterification mixture, whereby a resin which is soluble in acetone, in methyl acetate and in 1,4-dioxane is obtained.

WILLIAM O. KENYON.
THOMAS F. MURRAY, Jr.
LOUIS M. MINSK.